United States Patent [19]

Alle

[11] Patent Number: 4,640,959

[45] Date of Patent: Feb. 3, 1987

[54] ABS TYPE RESIN HAVING DISPERSE PARTICLES OF A RUBBER EXHIBITING A HIGH SOLUTION VISCOSITY AND A METHOD FOR ITS PREPARATION

[75] Inventor: Narasaiah Alle, Terneuzen, Netherlands

[73] Assignee: The Dow Chemical Company, Midland, Mich.

[21] Appl. No.: 761,291

[22] Filed: Jul. 29, 1985

Related U.S. Application Data

[63] Continuation of Ser. No. 533,038, Sep. 16, 1983, abandoned.

[51] Int. Cl.$^4$ ............................................ C08F 279/04
[52] U.S. Cl. ...................................... 525/316; 525/71; 525/53; 525/942; 525/243
[58] Field of Search .......................................... 525/316

[56] References Cited

U.S. PATENT DOCUMENTS

| | | | |
|---|---|---|---|
| 3,509,237 | 4/1970 | Aubrey | 525/71 |
| 3,914,339 | 10/1975 | Shima et al. | 525/316 |
| 3,954,903 | 5/1976 | Kudo et al. | 525/316 |
| 4,187,260 | 2/1980 | Kruse et al. | |
| 4,362,850 | 12/1982 | Bork | 525/316 |

*Primary Examiner*—Wilbert J. Briggs, Sr.
*Attorney, Agent, or Firm*—Philip D. Shepherd

[57] ABSTRACT

A rubber-reinforced copolymer comprising a copolymer matrix derived from one or more monovinylidene aromatic compounds and one or more unsaturated nitrile compounds having at least 6 percent of a rubber which exhibits a viscosity, as a 5 weight percent solution in styrene, of at least 120 centipoise dispersed as discrete particles throughout the copolymer matrix at a particle size of less than 1.5 micron.

16 Claims, No Drawings

ABS TYPE RESIN HAVING DISPERSE PARTICLES OF A RUBBER EXHIBITING A HIGH SOLUTION VISCOSITY AND A METHOD FOR ITS PREPARATION

CROSS-REFERENCE TO RELATED APPLICATION

This is a continuation of application Ser. No. 533,038 filed Sept. 16, 1983, now abandoned.

BACKGROUND OF THE INVENTION

This invention relates to rubber-reinforced copolymers, particularly to copolymers of monovinylidene aromatic and unsaturated nitrile having a rubber which exhibits a high solution viscosity dispersed as small rubber particles throughout the copolymeric matrix, and to a method for preparing the rubber-reinforced copolymer.

Rubber-reinforced (or modified) copolymers of a monovinylidene aromatic such as styrene and an unsaturated nitrile such as acrylonitrile having particulates of rubber, generally an alkadiene rubber, dispersed throughout the copolymeric matrix (conventionally referred to as ABS resins) are employed in a wide variety of commercial applications such as packaging, refrigerator linings, furniture, domestic appliances and toys. It is well known that the physical properties of an ABS resin such as toughness (i.e., the combination of elongation and impact strength), at both room and lower temperatures, are affected by the size, composition and morphology of the dispersed rubber particles and/or the concentration of rubber in the rubber-reinforced copolymers. For example, to achieve the balance of physical properties required in many applications, the rubber particles are necessarily dispersed through the copolymer matrix at a relatively small size, e.g., less than about 1.5 micron.

Heretofore, ABS resins have been prepared using a variety of polymerization techniques. For example, in one method for preparing an ABS resin, preformed rubber particles are admixed with styrene/acrylonitrile prior, during or subsequent to the polymerization of said monomers. In general, emulsion polymerization techniques are employed to prepare the preformed rubber particles which then comprise dense, rubber droplets of coagulated latex. Using said techniques, desirably small rubber particles can be prepared from essentially all rubbers which can be prepared using emulsion polymerization techniques. Unfortunately, significant costs are incurred in the preparation of the rubber particles using emulsion polymerization techniques and the emulsion polymerization aids such as the emulsifiers often have an undesirable effect on the properties of the resulting ABS resin product. Moreover, a relatively high concentration of the emulsion polymerized rubber particles is generally required to impart the desired balance of properties to the resulting rubber-reinforced copolymer product.

An alternative, more econcomical, method for preparing an ABS resin consists of mass polymerization techniques. Such techniques involve dissolving the rubber in a mixture of the styrene and acrylonitrile monomers and subsequently polymerizing the monomers. The resulting copolymer initially forms a discrete, discontinuous phase until, after sufficient polymerization, the rubber separates as a plurality of particles dispersed through a continuous phase now containing the copolymer (so-called "phase inversion"). Polymerization is completed and any solvent or unreacted monomer thereafter removed from the resulting product. (See, for example, U.S. Pat. No. 3,243,481). A similar process involves a combination of mass with suspension polymerization. In said method, following phase inversion, the polymerization mixture is suspended in water and polymerization completed. (See, for example, U.S. Pat. No. 3,509,237). Although an ABS resin can economically and effectively be prepared using either mass or mass/suspension polymerization techniques, ABS resins having the desired balance of physical properties have not heretofore been prepared using conventional mass or mass/suspension polymerization techniques with certain high molecular weight rubbers such as an essentially linear, high molecular weight, low-cis homopolymer of butadiene. Specifically, although the particle size of dispersed rubber can be reduced by increasing the rate of mechanical agitation in the polymerization reactor, an ABS resin wherein the high molecular weight rubber exhibits a desirably small particle size (i.e., a volume average particle size of less than 1.5 micron) at a sufficiently high concentration to impart the desired properties to the final product has not previously been prepared using mass or mass/suspension polymerization techniques.

Therefore, in view of the stated deficiencies of the ABS resins and the method for their preparation disclosed in the prior art, it remains highly desirable to provide an effective and economical method for preparing a rubber-reinforced copolymer of a monovinylidene aromatic and an unsaturated nitrile having discrete particles of a high molecular weight rubber dispersed throughout the copolymer matrix using mass or mass/suspension polymerization techniques.

SUMMARY OF THE INVENTION

Accordingly, in one aspect, the present invention is a rubber-reinforced copolymer comprising a copolymer matrix derived from one or more monovinylidene aromatic compounds and one or more unsaturated nitrile compounds and having at least 6 weight percent of a rubber which exhibits a viscosity, as a 5 weight percent solution in styrene, of at least 120 centipoise dispersed as discrete particles through the copolymer matrix, said weight percent being based on the total rubber and aromatic/nitrile copolymer. Said rubber particles contain occlusions of grafted and/or ungrafted polymer and have a volume average particle size of less than 1.5 micron.

The rubber-reinforced copolymers of the present invention often exhibit an excellent balance of properties. For example, in a preferred embodiment wherein the rubber is a linear, high molecular weight, low-cis homopolymer of butadiene, the rubber-reinforced copolymers exhibit unexpected practical toughness with a ductile fracture mechanism and a surprisingly high degree of gloss with good properties (e.g., elongation and impact strength) at both room and lower temperatures (e.g., −20° C).

In another aspect, the present invention is a method for preparing a rubber-reinforced copolymer of a monovinylidene aromatic, an unsaturated nitrile and, optionally one or more other comonomers, having discrete particles of a rubber which exhibits a high solution viscosity dispersed throughout the compolymer matrix. The method comprises mass polymerizing a solution of one or more monovinylidene aromatic compounds, one or more unsaturated nitrile compounds and at least 5 percent of a rubber which exhibits a viscosity, as a 5 weight percent solution in styrene, of at least 120 centipoise, said weight percent being based on the total weight of monomers and rubber. The mass polymerization is conducted at conditions which form a copolymer of the monovinylidene aromatic(s), unsaturated nitrile(s) and other optional comonomers having a sufficiently high molecular weight such that upon the phase inversion of the mass polymerization mixture and subsequent sizing of the rubber, the rubber is formed at a volume average particle size of 1.5 micron or less without excessively agitating the polymerization mixture. Following phase inversion and sizing of the rubber particles, polymerization is completed, generally using either mass or suspension polymerization techniques. Using mass polymerization techniques, subsequent to obtaining the desired conversion, the polymerization mixture is subjected to conditions sufficient to remove the unreacted monomers and/or to cross-link the rubber.

In the desired method, the copolymer of the monovinylidene aromatic and unsaturated nitrile exhibits a sufficiently high molecular weight at phase inversion such that, upon phase inversion and subsequent sizing, the rubber is readily dispersed throughout the continuous phase comprising the copolymer as discrete particles having a desirably small particle size. Such small particle size is achieved through chemical modification of the polymerization mixture without requiring excessive mechanical energy (i.e., agitation such as homogenization). Therefore, an ABS resin can effectively be prepared from a rubber which exhibits a high solution viscosity using mass or mass/suspension polymerization techniques.

Due to their excellent balance of physical properties, the rubber-reinforced copolymers of the present invention are useful in a wide variety of applications such as refrigerator liners, household appliances, toys and furniture.

DETAILED DESCRIPTION

The rubber-reinforced copolymers of the present invention comprise a copolymer matrix of at least one monovinylidene aromatic and at least one unsaturated nitrile having a high viscosity rubber dispersed throughout the copolymer phase at relatively small particle sizes. Representative monovinylidene aromatic compounds include styrene, alkyl-substituted styrenes such as α-alkystyrenes (e.g., α-methylstyrene and α-ethylstyrene) and ring-substituted styrenes (e.g., vinyltoluene, particularly p-vinyltoluene and o-ethylstyrene, t-butylstyrene and 2,4-dimethylstyrene); ring-substituted halostyrenes such as chlorostyrene, 2,4-dichlorostyrene and the like; and styrene substituted with both a halo and alkyl group such as 2-chloro-4-methylstyrene, vinylanthracene and mixtures thereof. In general, the polymer matrix is preferably derived from styrene or a combination of styrene and α-methylstyrene (advantageously, from 10 to 50, more advantageously from 15 to 40, weight percent of the α-methylstyrene based on the total weight of the styrene and α-methylstyrene). Styrene is the most preferred monovinylidene aromatic compound.

Representative unsatured nitriles are acrylonitrile, methacrylonitrile, ethacrylonitrile and the like, and mixtures thereof. Preferred of the unsaturated nitriles is acrylonitrile.

The amounts of the monovinylidene aromatic and unsaturated nitrile most advantageously employed herein will vary depending on the physical and chemical properties desired in the final, rubber-modified product. In general, the rubber-reinforced copolymer will advantageously comprise from 5 to 35, preferably from 15 to 25, weight percent of the unsaturated nitrile, and from 95 to 65, preferably from 85 to 75, weight percent of the monovinylidene aromatic based on the total weight of the monovinyldiene aromatic and unsaturated nitrile.

Minor amounts of other comonomers can also be employed in combination with the unsaturated nitrile and monovinylidene aromatic. Representative of such other comonomers are the conjugated dienes such as butadiene and isoprene; the α,β-ethylenically unsaturated carboxylic acids and esters thereof such as acrylic acid, methacrylic acid, methyl acrylate, methyl methacrylate, ethyl acrylate and 2-ethylhexyl acrylate; the ethylenically unsaturated amides such as acrylamide and methacrylamide; vinylidene chloride and vinylidene bromide; vinyl esters such as vinyl acetate and the like. If employed, these comonomers will generally be employed in amounts less than 10, more generally less than 5, weight percent based on the total weight of the monomers employed in preparing the rubber-reinforced product.

The rubber component employed in the rubber-reinforced copolymer is a rubber which exhibits a solution viscosity, as a 5 weight percent solution in styrene, of at least 120 centipoise at 25° C. when said viscosity is measured using a Canon-Fenske capillary viscometer (Capillary No. 400, 1.92 mm inside diameter). Hereinafter, a rubber exhibiting such high solution viscosity will be referred to as a "high viscosity rubber". Preferably, the solution viscosity of the rubber, as a 5 weight percent solution in styrene is at least 140, more preferably 150 centipoise. Although the present invention is suitably employed using a rubber having a solution viscosity, as a 5 weight percent solution in styrene, of 500 centipoise or more, the rubber will generally advantageously exhibit a viscosity of less than 300, more advantageously less than 250, centipoise. In general, the Mooney viscosity of such rubbers (ML-4,100° C.) is at least 40, more preferably 45.

Representative of such rubbers exhibiting a high solution viscosity are the linear, high molecular weight, low-cis homopolymers of butadiene. In general, the cis content of such rubbers is less than 55, more preferably less than 50 percent as determined by conventional IR spectrometry techniques and the weight average molecular weight, as determined by gel permeation chromotography techniques as described by ASTM designated D-3536 and expressed without correction for the differences between the rubber and polystyrene standards, is at least 325,000, preferably 375,000, with the ratio of weight average molecular weight to number average molecular weight being less than 3, more preferably less than 2.75. Representative linear, high molecular weight, low-cis homopolymers of butadiene include Diene 55 sold by the Firestone Tire and Rubber Co., CB-55-NFA and HX529-B sold by Bayer, Intene 55 sold by International Synthetic Rubber and Asadene 55 sold by Asahi Chemical. Preferred rubbers are the homopolymers of 1,3-butadiene which have a cis content of less than 50 percent, a weight average molecular weight of 400,000 to 600,000 with a ratio of weight average to number average molecular weight of less than 2.6.

The amounts of the high viscosity rubber most advantageously employed herein will depend on many factors including the specific high viscosity rubber employed, the specific type and amount of other rubbers, if any, employed in combination with the high viscosity rubber and the physical and chemical properties desired in the final, rubber-modified product. To obtain the most desired properties, the rubber-reinforced copolymer product will comprise at least 6 weight percent of the high viscosity rubber based on the total weight of the copolymer and rubber. Preferably, the rubber-reinforced copolymer comprises from 7 to 15, more preferably from 8 to 13 weight percent of the high viscosity rubber based on the weight of the copolymer and rubber. The rubber in the rubber-reinforced copolymer products of the present invention is dispersed throughout the copolymer matrix at a volume average particle size of less than 1.5, preferably less than 1.2 micrometer, more preferably less than 1.1 micrometer. In general, the dispersed rubber particle possess a volume average particle size of at least 0.1, preferably at least 0.2 micrometer. The rubber particles contain occlusions of grafted or ungrafted polymer. Typically, the rubber particles exhibit a so-called "coiled" or "cellular" morphology. Said particle size (diameter) is the diameter of the particles, including the occlusions present in the dispersed rubber particles, measured using conventional techniques such as by a Coulter Counter supplemented by visual phase contrast microsxopy or electron microscopy techniques.

In the preparation of the rubber-reinforced copolymer the high viscosity rubber is dissolved in the monomers to form at least a 5 weight percent solution, said weight percent being based on the total amounts of rubber and monomers employed. In general, the concentration of the rubber in said solution is less than 13.5 weight percent based on the total weight of rubber and monomers.

In general, but optionally, the monomer/rubber solution will contain an organic liquid diluent. Organic liquid diluents are normally liquid organic materials which do not boil at the polymerization conditions employed and which form a solution with the polymerizable monomers and the polymer prepared therefrom. Representative organic iquid diluents include aromatic and inertly substituted aromatic hydrocarbons such as toluene, benzene, ethylbenzene, xylene or the like; saturated or inertly substituted, saturated aliphatic having either straight or branched chains of five or more carbon atoms such as heptane, hexane, octane or the like; alicyclic or inertly substituted alicyclic hydrocarbons having five or six carbon atoms such as cyclohexane and the like. Preferred of such organic liquid diluents are the inertly substituted aromatics; with ethylbenzene and xylene being the most preferred. In general, the organic liquid diluent is employed in amounts sufficient to improve the processability, e.g., flow characteristics, of the polymerization mixture. Such amounts will vary depending on the rubber, monomer and diluent employed; the process equipment and the desired degree of polymerization. In general, if employed, the polymerization mixture will normally contain from 2 to 30 weight percent of the diluent based on the total weight of the rubber, monomer and diluent.

In addition, the mass polymerization mixture will contain other materials such as polymerization aids, e.g., polymerization initiators or chain transfer agents, an antioxidant (e.g., an alkylated phenol such as di-tert-butyl-p-cresol or phosphites such as trisnonyl phenyl phosphite); a mold release agent (e.g., zinc stearate), and/or a plasticizer or lubricant such as butylstearate, mineral oil or dioctyl phthalate which are optionally employed in the polymerization.

The resulting monomer/rubber solution is subsequently mass polymerized. During polymerization, the rubber is grafted with the polymerized monomers and the monomers copolymerized, with the copolymerized monomers coming out of solution and forming a discontinuous polymer phase dispersed throughout a continuous phase of the solution of rubber and monomers. Eventually, after sufficient amounts of the monomer are polymerized, the discontinuous copolymer phase becomes the continuous phase with the grafted rubber forming a discontinuous phase dispersed through the continuous copolymer phase. This phenomenom is referred to as "phase inversion" which term conventionally refers to the conversion of the copolymer, upon the polymerization of sufficient amounts of the polymerizable monomers, from a discontinuous phase dispersed in the continuous phase of the unpolymerized monomer through the point where there is no distinct continuous and no distinct discontinuous phase in the polymerization mixture, to a continuous copolymer phase having the rubber dispersed as discrete particles therethrough. Preferably, at phase inversion, the rubber is sufficiently grafted such that the disperse rubber particles, following initial sizing, are capable of retaining essentially the same average particle size and morphological properties throughout the remainder of the polymerization process.

In the practice of the present invention, the mass polymerization is conducted at conditions to form a copolymer of the monovinylidene aromatic(s) and unsaturated nitrile(s) having a sufficiently high molecular weight such that, upon phase inversion and subsequent sizing of the rubber particles, the rubber is dispersed as discrete particles having a volume average particle size of less than 1.5 micron. Preferably, the molecular weight of the copolymer is sufficiently high such that the rubber is capable of being dispersed through the copolymer matrix at a volume average particle size of less than 1.2 micrometer, more preferably less than 1.1 micrometer.

The molecular weight of the copolymer at phase inversion necessary for the formation of rubber particles of desirably small size depends on a variety of factors, particularly the composition of the polymerization mixture (e.g., the properties, particularly, the molecular weight, and concentration of the rubber and the type and concentration of the organic liquid diluent, if any, employed). In general, to obtain the small size rubber particles, the weight average molecular weight ($\overline{M}_w$) of the copolymer at phase inversion is at least 0.6, preferably at least 0.7, more preferably at least 0.8, times the $\overline{M}_w$ of the rubber employed. Specifically, using the preferred linear, high molecular weight, low-cis polybutadiene rubbers having a $\overline{M}_w$ from 400,000 to 450,000, the $\overline{M}_w$ of the copolymer at phase inversion should be 240,000 or more. In general, the $\overline{M}_w$ of the copolymer at phase inversion should not exceed 1.8 times the $\overline{M}_w$ of the rubber and will advantageously be less than 1.5 times the $\overline{M}_w$ of the rubber. Most preferably, the $\overline{M}_w$ of the copolymer is from 0.8 to 1.2 times the $\overline{M}_w$ of the rubber.

For the purposes of this invention, the molecular weight of the copolymer is determined on the ungrafted polymer which has been extracted from the remainder of the polymerization mixture at phase inversion or immediately thereafter by soaking the polymerization mixture in acetone for 24 hours, centrifuging the acetone containing mixture, recovering the supernatant liquid and drying the liquid to obtain the ungrafted copolymer. The molecular weight of this residue is then determined using the gel permeation chromatography techniques described in ASTM D-3536 and expressed without correction for the differences between copolymer and the polystyrene standards.

Preferably, the $\overline{M}_w$ of the copolymer at phase inversion is at least 300,000 and the number average molecular weight ($\overline{M}_n$) is at least 150,000. More preferably, the $\overline{M}_n$ is at least 360,000 and the $\overline{M}_w$ is at least 175,000.

Such molecular weights are more than those obtained in the preparation of ABS resins using conventional mass polymerization processes and one or more modifications are required in the polymerization process to prepare the copolymer having such increased molecular weight. For example, the amount and type of chain transfer agent employed prior to phase inversion have been found to affect the molecular weight of the copolymer. Specifically, increases in molecular weight are obtained by reducing the concentration of the chain transfer agent in the polymerization system and, in one embodiment of the present invention, polymerization is conducted employing a sufficiently low concentration of chain transfer agent such that a copolymer of the desirably high molecular weight can be prepared. Specificially, in conventional mass polymerization processes for preparing ABS resins, a chain transfer agent such as an alkyl mercaptan is added with the initial feed stream to the polymerization system. In this invention, this amount of chain transfer agent in the feed stream is reduced to a desirably low concentration. Advantageously, the feed stream contains no chain transfer agent and any chain transfer agent is added after phase inversion or, if added prior to phase inversion, only after sufficient amounts of the comonomers have been polymerized. Optionally, the preparation of the rubber-reinforced copolymer is conducted in the absence of a chain transfer agent, with the resulting rubber-reinforced product exhibiting high impact properties.

Alternatively, the type and amount of polymerization initiator has been found to affect the molecular weight of the copolymer. Specifically, the mass polymerization mixture will conventionally contain a polymerization initiator which is generally a free radical generating material such as chemical initiators including the peroxygen initiators (e.g., the perester initiators such as tertiarybutyl peroxybenzoate, di-t-butyl peoxyazelate and tertiarybutyl peroxyacetate), dibenzoylperoxide or mixtures of one or more chemical initiators: photochemical initiators and the like. The initiators are employed in an effective amount to initiate formation of the copolymer and the grafting of sufficient amounts of the copolymer to the rubber such that the dispersed rubber particles exhibit the desired size stability, which amount is generally at least 0.01, often at least 0.02, weight percent based on the weight of monomer in the feed. The maximum concentration of the initiator is generally dictated by the properties desired in the final product and economic considerations, with the initiator generally being employed in amounts less than 0.1 percent by weight of the monomers in the feed. Within these compositional limitations, if the polymerization rate is maintained constant such as by reducing the temperatures of polymerization, increasing the amount of the initiator in the polymerization mixture and/or increasing the activity of the initiator such as using a difunctional initiator, e.g., a diperoxide, as a partial or total replacement for a monofunctional initiator will generally increase the molecular weight of the resulting copolymer if the polymerization rate is maintained constant such as by reducing the temperatures of polymerization. Alternatively, increasing the molecular weight of the copolymer can be achieved by reducing the temperatures of polymerization while maintaining the other polymerization conditions constant, e.g., same concentration and activity of polymerization initiator.

In an alternative method, increases in the molecular weight of the copolymer are obtained by the addition of a molecular weight extender, e.g., a divinyl compound, to the polymerization mixture. Yet another alternative method for preparing a copolymer of a sufficiently high molecular weight involves conducting the polymerization prior to phase inversion using a reduced concentration of the organic reaction diluent.

Since the conditions at which polymerization is conducted are interrelated, one modification to the polymerization reaction will often require one or more other modifications to obtain the rubber-reinforced copolymer having the desired properties. For example, when the polymerization temperatures prior to phase inversion are reduced so as to increase the molecular weight of the copolymer, it is generally necessary to use higher polymerization temperatures following phase inversion to achieve the desired amounts of conversion. These interrelations in the polymerization conditions and the required modifications in the conditions of polymerization to obtain a desirable product are generally known to the skilled artisan and can be determined using simple experimental techniques.

Of the described techniques, the preferred methods to obtain a copolymer having the desired molecular weight consist of regulating the concentration of the chain transfer agent prior to phase inversion or conducting the polymerization in the presence of a desired amount of polymerization initiator and/or sufficiently low temperatures. Most preferably, the polymer of a sufficiently high molecular weight is obtained by regulating the concentration of the chain transfer agent within the polymerization mixture prior to phase inversion.

In general, continuous mass polymerization techniques are advantageously employed in preparing the rubber-reinforced copolymer product. Preferably, the polymerization is conducted in one or more substantially linear, stratified flow or so-called "plug flow" type reactors such as described in U.S. Pat. No. 2,727,884, which may or may not comprise recirculation of a portion of the partially polymerized product or, alternatively, in a stirred tank reactor wherein the contents of the reactor are essentially uniform throughout, which stirred tank reactor is generally employed in combination with one or more "plug-flow" type reactors. The temperatures at which polymerization is most advantageously conducted are dependent on a variety of factors including the specific initiator and the type and concentration of rubber, comonomers and reaction diluent, if any, employed. In general, polymerization temperatures from 60° to 160° C. are employed prior to phase inversion with temperatures from 100° to 190° C.

being employed subsequent to phase inversion. Mass polymerization at such elevated temperatures is continued until the desired conversion of the monomers to polymer is obtained. Generally, conversion of from 65 to 90, preferably from 70 to 85, weight percent of the monomers added to the polymerization system (i.e., monomer added in the feed and any additional stream, including any recycle stream) to polymer is desirable.

Following conversion of a desired amount of monomer to polymer, the polymerization mixture is then subjected to conditions sufficient to cross-link the rubber and remove any unreacted monomer. Such crosslinking and removal of the unreacted monomer, as well as any reaction diluent, if employed, and other volatile materials is advantageously conducted employing conventional devolatilization techniques, such as introducing the polymerization mixture into a devolatilizing chamber, flashing off the monomer and other volatiles at elevated temperatures, e.g., from 200° to 300° C., under vacuum and removing them from the chamber.

In general, using said continuous mass polymerization techniques at some point during the polymerization, preferably following phase inversion and subsequent sizing of the rubber particles, a second monomer-containing mixture is added to the polymerization system. Said second monomer-containing mixture is often advantageously a recycle stream consisting of volatiles recovered in the devolatilization step. While the relative proportions of the monomers, based on a total monomer weight, in the recycle can be identical to their relative proportions in the feed stream, the second monomer stream generally comprises greater concentrations of the organic liquid diluent than found in the original feed.

Alternatively, a combination of mass and suspension polymerization techniques are employed. Using said techniques, following phase inversion and subsequent size stabilization of the rubber particles, the partially polymerized product can be suspended with or without additional monomers in an aqueous medium which contains a polymerization initiator and polymerization subsequently completed. The rubber-reinforced copolymer is subsequently separated from the aqueous medium by acidification, centrifugation or filtration. The recovered product is then washed with water and dried.

The rubber-reinforced copolymer products of the present invention can also be prepared having disperse, rubber particles of the same or different rubbers having two or more distinct particle sizes, e.g., rubber particles exhibiting a bimodal size distribution. For example, a rubber-reinforced copolymer product having a bimodal particle size distribution can be prepared by mechanically blending the rubber-reinforced copolymer product containing either the same or a different rubber dispersed throughout the copolymer matrix at a second and different particle size. In another method, a partially polymerized product comprising the copolymer having the high viscosity rubber dispersed as particles of a first size is admixed with a partial polymerized product having the same or a different rubber dispersed therethrough at a second particle size. Polymerization of the resulting mixture is subsequently completed. In a preferred method for preparing a product having a bimodal particle size distribution of rubber, a second rubber-containing mixture comprising a solution of rubber in at least one monovinylidene aromatic and/or an unsaturated nitrile is admixed with the polymerization reaction mixture comprising a partial polymerized product of a copolymer having the high solution viscosity rubber dispersed therethrough and polymerization subsequently completed. Using similar techniques, a rubber-reinforced copolymer can be prepared having two or more rubbers, at least one of which is a high viscosity rubber, dispersed throughout the copolymer matrix at the same or essentially the same particle size.

The following examples are set forth to illustrate the advantages of the present invention and should not be construed to limit its scope. In the examples, all parts and percentages are by weight unless otherwise indicated.

EXAMPLE 1

To prepare a rubber-reinforced copolymer of styrene and acrylonitrile comprising a copolymer matrix having rubber of a high molecular weight, low cis homopolymer of butadiene dispersed therethrough, 710 parts of styrene, 363 parts of acrylonitrile, 268 parts of ethylbenzene, 109 parts of a linear, high molecular weight, low-cis homopolymer of butadiene having a solution viscosity as a five percent solution in styrene of 150 centipoise and 0.2 parts of a free radical initiator are added to a sufficiently sized batch reactor equipped with agitation and heating and cooling means. The reaction mixture is exposed to a constant agitation at a rate of 125 rpm. At the end of four hours, the reactor contains 24.4 percent solids and phase inversion is recently completed. The rubber particles dispersed throughout the continuous, copolymer phase exhibit a volume average particle diameter of 1.44 micrometers. At the end of five hours, the rubber particles exhibit a volume average particle diameter of 1.16 micrometers. At this point, the size of the rubber particles is essentially stabilized. At the end of six hours, the volume average particle size of the rubber particles is 1.13 micrometers. At this time, an additional 51 parts of styrene, 173 parts of ethylbenzene, 3 parts of an antioxidant and 2.5 parts of a chain transfer agent are added to the reaction vessel and the agitator speed is reduced to 60 rpm. Polymerization is continued for an additional hour and fifteen minutes. The temperature of the reaction mixture during polymerization is initially 95° C. and is continuously increased during the polymerization to a final temperature of 155° C. Subsequently, the reaction mixture is placed in a vacuum oven at 220° C. for 1 hour where the rubber is cross-linked and the residual monomer and ethylbenzene removed from the polymerization mixture. The volume average particle size of the rubber in the resulting product is found to be 1.1 micrometer when determined using a commercially available particle size analyzer (e.g., Coulter Counter) supplemented as necessary by transmission electron microscopy.

COMPARATIVE EXAMPLE 1

A rubber-reinforced copolymer of styrene and acrylonitrile comprising a copolymer matrix having dispersed particles of a high molecular weight, low-cis homopolymer of butadiene dispersed therethrough is prepared using the techniques described in Example No. 1 except that the feed stream contains 2 parts of a chain transfer agent. After four hours, phase inversion has occurred. The volume average particle size of the dispersed rubber phase at this time is 3.6 micrometer. An additional monomer stream having the same composition as the additional monomer stream added in Example No. 1 is added to the reactor at this time and the agitator speed is reduced to 60 rpm. Polymerization is continued for an additional three hours (7 hours total). Following removal of the volatiles, the disperse rubber particles have a volume average particle size of 2.4 micrometer.

As evidenced by Example No. 1, a rubber-reinforced copolymer of a monovinylidene aromatic and an unsaturated nitrile having a rubber which exhibits a high solution viscosity dispersed throughout the copolymer matrix at a sufficiently small particle size can be prepared using mass polymerization techniques by the methods of this invention. The relatively small particle size is obtained by preparing a copolymer of a sufficient molecular weight, by delaying the addition of the chain transfer agent until after phase inversion, such that the ratio of viscosity of the rubber to the viscosity of the continuous copolymer phase upon phase inversion is sufficiently low to allow the preparation of the relatively small particles without excessive mechanical agitation. If the chain transfer agent is not omitted from the initial stages of the polymerization, as evidenced by the rubber-reinforced copolymer prepared in Comparative Example 1, the particle size of the rubber is significantly larger. Such large particle size results in rubber-reinforced copolymer having less desirable physical properties than the rubber-reinforced copolymer having the relatively small rubber particles.

EXAMPLE 2

A rubber-reinforced copolymer comprising a copolymer matrix of styrene and acrylonitrile having rubber which exhibits a high solution viscosity dispersed therethrough, is prepared using several "plug-flow" type reactors essentially as described in U.S. Pat. No. 2,727,884. The reactors are connected in series and each reactor is equipped with a variable speed agitator and heating and cooling means. To the top of the first reactor is continuously added a solution comprising 55 percent styrene, 17.3 percent acrylonitrile, 20 percent ethylbenzene, 7.5 percent of a low-cis, polybutadiene rubber exhibiting a solution viscosity as a 5 weight percent solution in styrene of 150 centipoise, 0.2 percent of an antioxidant and 0.015 percent of a free radical initiator. During phase inversion and subsequent sizing of the rubber particles, the polymerization mixture is exposed to agitation rates of 240 rpm. Upon obtaining 40 percent solids, 12 parts, per each 100 parts of the feed stream, of a monomer mixture comprising 26 percent styrene, 11.4 percent acrylonitrile, 62.5 parts ethylbenzene and 0.5 percent of a chain transfer agent is added to the polymerization mixture. Following the addition of this mixture, the polymerization is continued until the desired conversion of monomer to polymer is achieved. The resulting mixture is then discharged from the base of the last reactor and passed to a devolatilizer, wherein the rubber is further cross-linked and the residual monomer and ethylbenzene are removed from the polymerization mixture. Upon analysis of the resulting rubber-reinforced copolymer product, the volume average particle size of the high molecular weight, low-cis homopolymer of butadiene was found to be 0.65 micrometer.

A rubber-reinforced copolymer is prepared using a identical technique except that the agitation provided at phase inversion and subsequent sizing of the rubber particles is at a rate of 200 rpm. Upon analysis of the final product, the volume average particle size of the rubber particles is found to be 0.62 micrometer.

Yet another rubber-reinforced copolymer is prepared using the same techniques except that the agitation provided at phase inversion and subsequent particle sizing is at a rate of 150 rpm. In this case, the rubber particles in the final product were found to have a volume average particle size of 0.65 micrometer. The rubber-reinforced polymer is designated Sample No. 1.

A rubber-reinforced copolymer prepared using identical techniques except that the phase inversion and subsequent sizing of the rubber particles is conducted at 90 rpm is found to have a rubber particle size of 0.88 micrometer. This copolymer product is designated as Sample No. 2. In addition, a rubber-reinforced copolymer prepared by identical techniques except having an agitation rate of 60 rpm at phase inversion and subsequent sizing of the rubber exhibits a particle size of 1.35 micrometer.

As evidenced by the foregoing, a rubber-reinforced copolymer can be prepared having a rubber which exhibits a high solution viscosity dispersed therethrough at a relatively small particle size without requiring excessive agitation rates using the methods of this invention. In fact, using the chemical techniques disclosed herein for sizing the rubber, a minimum rubber particle size is obtained at a certain agitation rate above which further reductions in particle size are not achieved.

COMPARATIVE EXAMPLE

A rubber-reinforced copolymer comprising a copolymer matrix of styrene and acrylonitrile having a high molecular weight, low-cis homopolymer of butadiene dispersed therethrough is prepared using identical techniques to those in preparing Sample No. 1 except that the feed solution comprises 0.15 percent of a chain transfer agent. The volume average particle size of the homopolymer of butadiene in the final product is 2.9 micrometer. This rubber-reinforced copolymer is designated Sample No. A.

The physical properties of Sample Nos. 1 and 2 and Sample No. A are measured to compare a rubber-reinforced polymer of the present invention with a rubber-reinforced copolymer prepared using conventional techniques. The results of this testing are reported in Table No. 1.

TABLE 1

|  | Sample No. | | |
| --- | --- | --- | --- |
|  | A* | 1 | 2 |
| Rubber particle Size, $\mu$m (1) | 2.9 | 0.65 | 0.88 |
| Izod Impact Strength, J/m (2) | | | |
| Room Temperature | 110 | 181 | 186 |
| −20° C. | 65 | 117 | 123 |
| Gloss, % (3) | | | |
| 15° C. | 30 | 80 | 75 |
| 50° C. | 40 | 90 | 85 |
| Tensile Properties (4) | | | |
| Yield, N/mm$^2$ | 30 | 42 | 38 |
| Elongation at Break, % | 30 | 5 | 35 |
| Melt Flow Rate g/10 min (5) | 2.2 | 2.0 | 1.6 |
| Charpy Impact Strength, Kj/m$^2$, (6) | 8 | 12.5 | 14.0 |

*Not an example of the present invention.
(1) Rubber particle size is the volume average particle size as determined using a commercially available particle size analyzer (e.g., a Counter Coulter Model TA II unit) supplemented as necessary by transmission electron microscopy.
(2) Izod impact strength is the notched Izod impact expressed in Joules/meter (j/m) measured using the test method described by ASTM D256 and test

TABLE 1-continued specimens which have been prepared by compression molding at a mold temperature of 220° C. for 15 minutes. Impact testing is conducted at both room temperature and at −20° C.

(3) Gloss is measured using ASTM test method designated D523-80, 60° angle, on a sample molded at 50° C. and a sample molded at 15° C. The sample molded at 50° C. is prepared having dimensions of 10 cm × 10 cm × 2 mm which is injection molded at a mold temperature of 50° C. and a melt temperature of 215° C. The mold employed is a smooth surface mold having surface roughness factor 0.02. To prepare the test specimen the rubber-reinforced polymer is injected at an injection pressure which is increased until a flash molding appears and then reduced to a pressure such that no excess material (flash molding) appears. The injection pressure at that point is employed. The gloss is measured 3.5 cm from the side of the sample opposite the point of injection in the middle of the sample width. The 15° C. sample is prepared in an identical manner except employing a 15° C. mold temperature.

(4) Tensile properties are measured using the test methods of ASTM-D-638 on samples which are compression molded by the methods described in Footnote 2 with tensile yield being expressed in newtons per square millimeter ($N/mm^2$) and elongation being the % elongation at break.

(5) Melt flow rate is measured using test method designated ASTM D-1238, 230° C.-3.8 kilopascals.

(6) Charpy impact strength, expressed in kilojoules per square meter $Kj/m^2$, is measured using the test method of DIN 53-453 on injection molded samples prepared in a manner similar to that set forth in Footnote 3.

As evidenced by the data in Table 1, the physical properties of the ABS resin of the present invention which comprises a copolymer matrix of styrene and acrylonitrile having a high molecular weight, low-cis rubber at a small particle size dispersed therethrough are significantly better than those properties exhibited by an ABS resin having rubber particles of a larger size dispersed through the copolymer matrix.

EXAMPLE 3

A rubber-reinforced copolymer comprising a copolymer matrix of styrene and acrylonitrile having a high molecular weight, low-cis rubber dispersed therethrough is prepared using several "plug-flow" type reactors connected in series. Each reactor is equipped with a variable speed agitator and heating and cooling means. To the top of the first reactor is continuously added a solution comprising 56.3 percent styrene, 16 percent acrylonitrile, 20 percent ethylbenzene, 7.5 percent of a linear low-cis, high molecular weight polybutadiene rubber, 0.2 percent of an antioxidant and 0.015 percent of a free radical polymerization initiator. Prior to phase inversion, but after the polymerization mixture has obtained a 20 percent solids level, an additional 10 parts, per 100 parts of feed, of a monomer mixture comprising 25 percent of styrene, 5 percent of acrylonitrile, 69.5 percent of ethylbenzene and 0.5 percent of a chain transfer agent is added to the polymerization mixture. Shortly thereafter, phase inversion occurs and the disperse rubber particles are subsequently sized. Polymerization is then continued at conditions sufficient to obtain the desired conversion of monomer to polymer. The resulting mixture is then discharged from the base to the last reactor and passed to a devolatilizer where the rubber is further cross-linked and the residual monomer and ethylbenzene removed from the polymerization mixture. This rubber-reinforced copolymer is designated Sample No. 1.

A rubber-reinforced copolymer is prepared using the same techniques except that 12 parts, per 100 parts of the feed, of a second monomer mixture having the same composition as the second monomer mixture employed in preparing Sample No. 1 is added subsequent to phase inversion rather than prior to phase inversion when the solids level in the polymerization mixture reaches 30 percent. This rubber-reinforced copolymer is designated Sample No. 2.

Yet another rubber-reinforced copolymer is prepared using the techniques described in preparing Sample No. 2 except that the second monomer mixture is added (15 parts, per 100 parts of the feed) when the solids in the polymerization mixture is at 35 percent. This rubber-reinforced copolymer is designated Sample No. 3.

The volume average particle diameters and various physical properties of each of the thus prepared rubber-reinforced copolymer products are measured. The results of this testing are set forth in Table II. In addition, for purposed of comparison, the properties of Sample No. A of Example No. 2 are recorded in Table II.

TABLE II

| | Sample No. | | | |
|---|---|---|---|---|
| | A* | 1 | 2 | 3 |
| Rubber particle Size, μm (1) | 2.9 | 1.1 | 0.88 | 0.65 |
| Izod Impact Strength, J/m (2) | | | | |
| Room Temperature | 110 | 192 | 166 | 166 |
| −20° C. | 65 | 133 | 112 | 112 |
| Gloss, % (3) | | | | |
| 15° C. | 30 | 65 | 75 | 85 |
| 60° C. | 40 | 85 | 87 | 92 |
| Tensile Properties (4) | | | | |
| Yield, $N/mm^2$ | 30 | 35 | 37 | 40 |
| Elongation at Break, % | 30 | 40 | 30 | 5 |
| Melt Flow Rate g/10 min (5) | 2.2 | 1.5 | 2.0 | 2.0 |
| Charpy Impact Strength, $Kj/m^2$, (6) | 8 | 15 | 13.5 | 12.5 |

*Not an example of the present invention.
(1-6) Same as Notes 1-6 in Table I.

As evidenced by the data in Table II, the rubber-reinforced copolymers of the present invention exhibit a surprisingly good balance of physical properties. In addition, the volume average particle size is found to be affected by the amounts of chain transfer agent added to the polymerization mixture and the point of their addition. Specifically, the rubber particle size is found to be smaller when chain transfer agent addition is delayed until after phase inversion. Moreover, if the chain transfer agent is added prior to phase inversion, the rubber particle size significantly depends on the concentration of the chain transfer agent and the place of its addition.

EXAMPLE 4

A rubber-reinforced copolymer comprising a copolymer matrix of styrene and acrylonitrile having a rubber which exhibits a high solution viscosity dispersed therethrough is prepared using the techniques employed in the preparation of Sample No. 1 of Example No. 3 except that the initial feed comprises 21.5 percent acrylonitrile, 50.3 percent styrene, 20 percent ethylbenzene, 8 percent of a linear, high molecular weight, low-cis polybutadiene 0.2 percent of an antioxidant and 0.015 percent of a free radical initiator and when the polymerization mixture reaches about 20 percent solids, which occurs prior to phase inversion of the polymerization mixture, 14 parts, per 100 parts of the feed, of a second monomer-containing mixture comprising 11 percent acrylonitrile, 25.4 percent styrene, 63 percent ethylbenzene and 0.6 percent of a chain transfer agent is added to the polymerization mixture.

The volume average particle size of the dispersed rubber phase of the resulting product is 1.3 micrometer. The product exhibits an exceptional good balance of physical properties with an Izod impact of 160 J/m; a gloss of 60 percent at 50° C. and 50 percent at 15° C. mold temperature; a tensile yield of 39 N/mm², an elongation at break of 45 percent and a melt flow rate of 2.1 g/10 min.

EXAMPLE 5

A rubber-reinforced copolymer comprising a copolymer matrix of styrene and acrylonitrile having a rubber which exhibits a high solution viscosity dispersed therethrough is prepared using the techniques employed in the preparation of Sample No. 3 of Example No. 3 except that the initial feed comprises 12 percent acrylonitrile, 63.3 percent styrene, 20 percent ethylbenzene, 7.5 percent of a linear, high molecular weight, low-cis polybutadiene, 0.2 percent of an antioxidant and 0.015 percent of a free radical initiator and when the polymerization mixture reaches about 35 percent solids, which occurs prior to phase inversion of the polymerization mixture, 6.5 parts, per 100 parts of the feed, of a second monomer-containing mixture comprising 11 percent acrylonitrile, 25.4 percent styrene, 62.1 percent ethylbenzene and 1.5 percent of a chain transfer agent is added to the polymerization mixture.

The volume average particle size of the disperse rubber phase of the resulting product is 0.9 micrometer. This product also exhibits an exceptional good balance of physical properties with an Izod impact of 190 J/m; a gloss of 90 percent at 50° C. and 80 percent at 15° C. mold temperature; a tensile yield of 34 N/mm², an elongation at break of 15 percent, a melt flow rate of 2.4 g/10 min and a charpy impact strength of 15 Kj/m².

EXAMPLE 6

A rubber-reinforced copolymer is prepared in a manner identical to that employed in Example 5, except that no second monomer mixture is added to the polymerization mixture. The resulting product which has been prepared using no chain transfer agent contains disperse rubber particles having a volume average particle size of 0.9 micrometer. The product exhibits a surprisingly high Izod impact of 213 J/m; a gloss of 85 percent at 50° C. and 75 percent at 15° C. mold temperature; a tensile yield of 34 N/mm², an elongation at break of 15 percent and a melt flow rate of 1.4 g/10 min.

EXAMPLE 7

A rubber-reinforced copolymer comprising a copolymer matrix of styrene and acrylonitrile having a rubber which exhibits a high solution viscosity dispersed therethrough is prepared using the techniques employed in the preparation of Sample No. 2 of Example No. 2, except that the initial feed comprises 22 percent acrylonitrile, 50.3 percent styrene, 20 percent ethylbenzene, 7.5 percent of a linear, high molecular weight, low-cis polybutadiene, 0.2 percent of an antioxidant and 0.015 percent of a free radical initiator and when the polymerization mixture reaches about 17 percent solids, which occurs prior to phase inversion of the polymerization mixture, 9 parts, per 100 parts of the feed, of a second monomer-containing mixture comprising 11 percent acrylonitrile, 25.4 percent styrene and 63.6 percent ethylbenzene is added to the polymerization mixture.

The volume average particle size of the disperse rubber phase of the resulting product is 1.05 micrometer. This product also exhibits an exceptional good balance of physical properties with a surprisingly high Izod impact of 320 J/m; a gloss of 65 percent at 50° C. and 50 percent at 15° C. mold temperature; a tensile yield of 41 N/mm², an elongation at break of 30 percent, and a melt flow rate of 0.5 g/10 min.

What is claimed is:

1. A method for preparing a rubber-reinforced copolymer comprising mass polymerizing prior to phase inversion a solution of one or more monvinylidene aromatic compounds, one or more unsaturated nitrile compounds and at least 5 percent of a rubber which exhibits a viscosity, as a 5 weight percent solution in styrene, of at least 120 centipoise, said weight percent being based on the total weight of monomers and rubber, at conditions to form a copolymer of the monovinylidene aromatic compounds or compounds and unsaturated nitrile compound or compounds having a sufficiently high molecular weight such that, upon phase inversion of the mass polymerization mixture and subsequent sizing of the rubber, the rubber becomes dispersed at a volume average particle size of 1.5 micrometer or less without excessively agitating the polymerization mixture and, after phase inversion and sizing of the rubber particles, continuing polymerization to convert the desired amounts of monovinylidene aromatic compound or compounds and unsaturated nitrile compound or compounds to polymer.

2. The method of claim 1 wherein the solution of the rubber and monomers further comprises from 2 to 30 weight percent of an organic liquid diluent, said weight percent being based on the weight of the rubber, monomers and diluent.

3. The method of claim 2 wherein the weight average molecular weight of the copolymer at phase inversion is at least 0.6 times the weight average molecular weight of the rubber.

4. The method of claim 2 wherein the weight average molecular weight of the copolymer at phase inversion is at least 240,000.

5. The method of claim 4 wherein at least a portion of the polymerization prior to phase inversion is conducted in the absence of a chain transfer agent.

6. The method of claim 5 wherein the preparation of the rubber-reinforced copolymer product is conducted both prior to and subsequent to phase inversion in the absence of a chain transfer agent.

7. The method of claim 3 wherein the polymerization prior to phase inversion is conducted in the presence of a difunctional initiator.

8. The method of claim 3 wherein the polymerization prior to phase inversion is conducted employing a sufficiently low concentration of chain transfer agent such that a copolymer of a desirably high molecular weight at phase inversion is prepared.

9. The method of claim 3 wherein the polymerization of the monomers prior to phase inversion is conducted in the presence of a molecular weight extender.

10. The method of claim 2 wherein the weight average molecular weight of the copolymer at phase inversion is at least 300,000 and the weight average molecular weight of the copolymer is at least 0.8 times the weight average molecular weight of the rubber.

11. The method of claim 3 wherein the continued polymerization, following phase inversion, is conducted using mass polymerization techniques.

12. The method of claim 3 wherein the continued polymerization following phase inversion, is conducted using suspension polymerization techniques.

13. The method of claim 1, wherein the rubber has a Mooney viscosity of at least 40.

14. The method of claim 1, wherein the continued polymerization, following phase inversion, is conducted using mass polymerization techniques.

15. The method of claim 1, wherein the solution additionally comprises a minor amount less than 10 percent by weight of one or more comonomers selected from the group consisting of conjugated dienes; $\alpha$, $\beta$-ethylenically unsaturated carboxylic acids and esters thereof; ethylenically unsaturated amides; and vinyl esters.

16. The method of claim 1, wherein the solution additionally comprises a minor amount less than 10 percent by weight of one or more comonomers selected from the group consisting of: butadiene, isoprene, acrylic acid, methacrylic acid, methyl acrylate, methyl methacrylate, ethyl acrylate, 2-ethylhexyl acrylate, acrylamide, methacrylamide, vinylidene chloride, and vinyl acetate.

* * * * *